(12) United States Patent
Carle et al.

(10) Patent No.: US 10,005,502 B2
(45) Date of Patent: Jun. 26, 2018

(54) DEVICE AND METHOD FOR EXERTING A TORQUE ON AN OBJECT

(71) Applicant: Robert Bosch GmbH, Stuttgart (DE)

(72) Inventors: Wolfgang Carle, Sonnenbuehl-Erpfingen (DE); Michael Schmitt, Modugno (IT)

(73) Assignee: ROBERT BOSCH GMBH, Stuttgart (DE)

( * ) Notice: Subject to any disclaimer, the term of this patent is extended or adjusted under 35 U.S.C. 154(b) by 266 days.

(21) Appl. No.: 14/402,637

(22) PCT Filed: Mar. 26, 2013

(86) PCT No.: PCT/EP2013/056387
§ 371 (c)(1),
(2) Date: Nov. 20, 2014

(87) PCT Pub. No.: WO2013/174550
PCT Pub. Date: Nov. 28, 2013

(65) Prior Publication Data
US 2015/0175224 A1 Jun. 25, 2015

(30) Foreign Application Priority Data

May 23, 2012 (DE) .......................... 10 2012 208 623

(51) Int. Cl.
*G01C 19/02* (2006.01)
*B62D 37/06* (2006.01)
*B62J 27/00* (2006.01)
*B62K 17/00* (2006.01)

(52) U.S. Cl.
CPC .............. *B62D 37/06* (2013.01); *B62J 27/00* (2013.01); *B62K 17/00* (2013.01); *Y10T 74/1218* (2015.01)

(58) Field of Classification Search
CPC ........... B62D 37/06; B62J 27/00; B62K 17/00
See application file for complete search history.

(56) References Cited

U.S. PATENT DOCUMENTS

| 2,693,970 | A | | 11/1954 | Coleman et al. | |
|---|---|---|---|---|---|
| 2,953,926 | A | * | 9/1960 | Wrigley | .................. G01C 21/16 33/321 |
| 3,082,631 | A | * | 3/1963 | Bishop | ................... G01C 19/04 74/5.4 |

(Continued)

FOREIGN PATENT DOCUMENTS

| CN | 1896560 A | 1/2007 |
|---|---|---|
| DE | 41 12 447 | 10/1992 |

(Continued)

OTHER PUBLICATIONS

International Search Report for PCT/EP2013/056387, dated Mar. 26, 2013.

*Primary Examiner* — Zakaria Elahmadi
(74) *Attorney, Agent, or Firm* — Norton Rose Fulbright US LLP; Gerard Messina

(57) ABSTRACT

A device for exerting torque on an object includes: at least one rotating mass rotatably supported about an axis of rotation; a drive for driving the rotating mass; a bearing which enables a change in the alignment of the axis of rotation relative to the object; and a coupling unit which engages on the bearing and couples the rotating mass to the object.

13 Claims, 3 Drawing Sheets

(56) References Cited

U.S. PATENT DOCUMENTS

| | | | | |
|---|---|---|---|---|
| 3,205,718 | A * | 9/1965 | Wierenga | G01C 19/04 250/208.4 |
| 3,424,401 | A * | 1/1969 | Maurer | B64G 1/28 244/165 |
| 3,471,105 | A * | 10/1969 | Chang | B64G 1/28 244/165 |
| 3,741,500 | A * | 6/1973 | Liden | B64G 1/286 244/165 |
| 4,230,294 | A * | 10/1980 | Pistiner | B64G 1/285 244/165 |
| 4,295,381 | A * | 10/1981 | Hinds | F02G 1/0435 74/126 |
| 4,573,651 | A | 3/1986 | Stanton | |
| 4,732,353 | A * | 3/1988 | Studer | B64G 1/28 244/165 |
| 4,961,352 | A * | 10/1990 | Downer | F16C 32/0438 310/90.5 |
| 5,386,738 | A * | 2/1995 | Havenhill | B64G 1/286 74/5.22 |
| 5,871,249 | A * | 2/1999 | Williams | B66C 13/08 294/81.4 |
| 6,232,671 | B1 * | 5/2001 | Gottfried, Jr. | F16F 15/315 290/1 A |
| 6,834,561 | B2 * | 12/2004 | Meffe | B64G 1/286 74/5.46 |
| 6,973,847 | B2 * | 12/2005 | Adams | B63B 39/04 114/121 |
| 8,423,202 | B2 | 4/2013 | Kimura et al. | |
| 8,573,079 | B2 * | 11/2013 | Peng | G02B 26/001 74/5.22 |
| 9,097,243 | B2 * | 8/2015 | Tippett | F03G 3/08 |
| 2006/0032985 | A1 * | 2/2006 | Smith | B64G 1/286 244/165 |
| 2007/0298942 | A1 * | 12/2007 | Hamady | A63B 21/22 482/110 |
| 2008/0302183 | A1 * | 12/2008 | Peng | G02B 26/001 73/504.12 |
| 2013/0274995 | A1 * | 10/2013 | Kim | B62D 37/06 701/36 |

FOREIGN PATENT DOCUMENTS

| | | |
|---|---|---|
| DE | 10 2004 060 292 | 7/2006 |
| FR | 2 693 970 | 1/1994 |
| GB | 27212 | 3/1903 |
| JP | H0369861 A | 3/1991 |
| JP | H0513878 A | 2/1993 |
| JP | H11 116181 | 4/1999 |
| JP | 2008143390 A | 6/2008 |
| JP | 2009248618 A | 10/2009 |
| JP | 2010143580 A | 7/2010 |
| WO | WO 2006/004581 | 1/2006 |
| WO | WO 2011/115699 | 9/2011 |

* cited by examiner

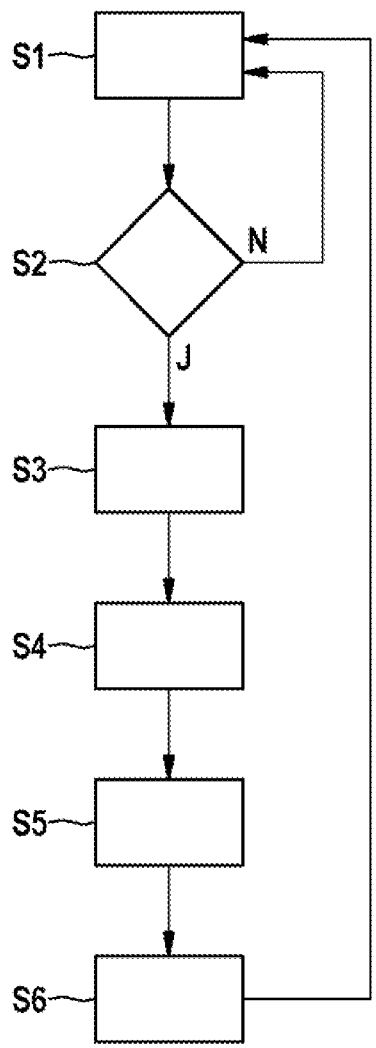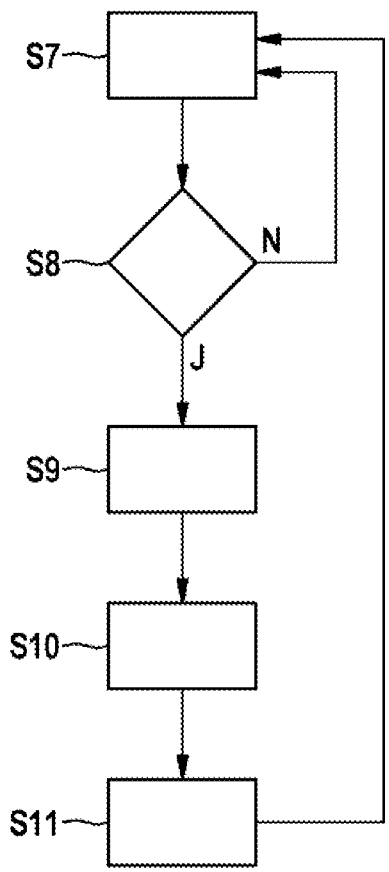
Fig. 3a                    Fig. 3b

DEVICE AND METHOD FOR EXERTING A TORQUE ON AN OBJECT

BACKGROUND OF THE INVENTION

1. Field of the Invention

The present invention relates to a device and a method for exerting a torque on an object.

2. Description of the Related Art

Current motor vehicles, such as passenger cars, are equipped as a rule with a vehicle dynamics control which in a critical driving situation, that is, for example at high wheel slip, automatically intervenes in the driving action, and initiates measures for stabilizing the vehicle. For this purpose, as a rule, braking or acceleration forces are exerted on the vehicle, for instance by specifically braking or accelerating individual wheels. Known vehicle dynamics controls are used to stabilize the vehicle, but also to bring back the vehicle from a critical driving situation to a stable driving situation.

In four-wheel vehicles, known vehicle dynamics controllers function sufficiently well in most driving situations. By contrast, in two-wheel vehicles the known vehicle dynamics controls are not in a position to stabilize the vehicle sufficiently or to bring it back from a critical driving situation to a stable driving situation. One of the reasons for this is that high torques are able to act on the motorcycle, which cannot be, or can only insufficiently be counteracted by braking or steering interventions, which is different from the case of passenger cars.

Published German patent application document DE 41 12 447 A1 describes a method for stabilizing a motorcycle using a gyroscopically acting flywheel. However, using the flywheel one is able to act only insufficiently on the two-wheel vehicle.

In addition to vehicles, other devices, such as machines having moving parts, such as drilling machines, robots, fitness machines, etc., may demonstrate operating states in which relatively high torques are acting. Such torques usually occur during the accelerating (or braking) of the device, or a part thereof, such as during the running-up of a drilling machine or during the acceleration of a robot arm. In this case, the rotational pulse of the accelerated part acts back on the entire device. This is frequently not desirable, since the reaction of the torque has an impairing effect on the functioning or operability of the device.

BRIEF SUMMARY OF THE INVENTION

It is therefore an object of the present invention to create a device and a method by which a motion and/or the position of an object are able to be stabilized rapidly and efficiently. In addition, a vehicle, in particular a two-wheel vehicle, is also to be created which is able to be stabilized simply and effectively.

According to the present invention, a device is provided for exerting torque on an object, having at least one rotating mass that is rotatably supported about an axis of rotation, and a drive for driving the rotating mass as well as bearing means for supporting the rotatably supported rotating mass on the object. In addition, according to the present invention, coupling means engaging with the bearing means are provided, using which the rotating mass is optionally able to be coupled with the object or decoupled from the object. In the decoupled state, the rotational axis of the rotating mass is able to change its position at least along a specified path, without a significant force, apart from frictional forces, being transmitted to the object. In the coupled state, by contrast, the rotating mass and the object are mechanically connected, so that a torque transmission is able to take place from the rotating mass to the object (and vice versa). In this state, it is therefore possible to exert a specific torque on the object, in order to stabilize the motion or the position of the object.

The axis of rotation of the rotating mass may, for instance, in the case of a flywheel, be an internal axis of rotation, or, for instance, in the case of a mass moving on a circular path, be an external axis of rotation.

Depending on the design of the bearing means, the position of the rotational axis of the rotating mass may change relative to the object, for instance, in a subarea of a plane, in an entire plane, in a subregion of three-dimensional space or within the entire three-dimensional space.

According to one preferred specific embodiment of the device, the bearing means include a Cardanic suspension. This makes it possible that the axis of rotation is able to assume an optional alignment relative to the object in three-dimensional space.

According to the present invention, the coupling means are developed so as to be able optionally to release the bearing means or to fix them in position. When the rotating mass is coupled to the object, a change in the rotational pulse of the rotating mass, which by definition is effected by exerting a torque, produces a counter-torque acting on the object. In the decoupled state, essentially no force is transmitted.

A torque change in the rotating mass may be reached, in principle, in two ways: for one thing, the rotational motion or the revolution of the rotating mass may be accelerated (with a positive and also a negative sign). For another thing, the position of the axis of rotation may also be changed. Both measures produce a rotational pulse change which, in the coupled state, is transmitted to the object.

According to one specific embodiment of the present invention, a brake is provided with which the at least one rotating mass is able to be specifically braked. An electric motor, which is operated regeneratively, may also be used as a brake, for example. To accelerate the revolution of the rotating mass, an electric motor may also be provided.

In order to change the position of the axis of rotation, a drive may be provided having an electric motor, or another type, for instance, a purely mechanical drive, may be provided. If the axis of rotation is changed using the drive, then by definition the rotational pulse of the rotating mass also changes, so that, in turn, a counter-torque acting on the object is generated. The drive may engage with the bearing means, for example, and adjust them.

In response to a change in the position of the axis of rotation, the rotational pulse of the rotating mass may, for instance, be held constant in absolute value (it changes vectorially), for instance, using a drive and/or a brake. One may thereby transmit a torque to the object, without excessively building up or lowering kinetic energy on the rotating mass. In this context, the gyroscopic effect is utilized for the stabilization.

In one special specific embodiment of the present invention, several, in particular six rotating masses are provided, which are combined in one body which is Cardanically suspended on the object. In each case, in this connection, preferably two rotating masses rotate about the same axis of rotation, but in opposite directions. The axes of rotation of the three pairs of rotating masses are preferably extensively perpendicular to one another. By specific acceleration or braking of individual or several of the rotating masses, or by changing the alignment of the axes of rotation, one may effect an optional overall rotational pulse change of the body, which may then be transmitted to the object.

Besides the device described, the present invention also includes a vehicle having a device according to the present invention. Using a device, according to the present invention, for exerting torque on a vehicle, particularly a two-wheeler, is also the subject matter of the present invention. A vehicle equipped with a device according to the present invention may be stabilized relatively rapidly and efficiently, or may be brought back from an unstable to a stable driving situation.

Finally, a method for exerting torque on an object is also the subject matter of the present invention. According to the present invention, it is provided that one first record data on a stability state of the object, using at least one sensor, and from the recorded data to ascertain whether the stability state should be graded as critical. If the stability state satisfies a specified condition, a torque is ascertained that is to be transmitted to the object, and this torque is exerted on at least one of the rotating masses. Still ahead of this, the coupling means are operated and thereby the at least one rotating mass is coupled to the object, so that a torque transmission is able to take place.

According to one preferred specific embodiment of the method according to the present invention, if the stability state has been graded as being critical, the bearing means are fixed in position and at least one rotating mass is braked or accelerated.

According to another specific embodiment of the method according to the present invention, the position of the axis of rotation is changed. The rotational speed of a revolution of the rotating mass may be held constant, if necessary, in this instance.

If the method according to the present invention for exerting torque on a vehicle is applied, at least one acceleration and/or one rate of rotation are recorded as data for the stability state. An acceleration sensor or a rotational rate sensor, for example, is used for this purpose.

In the following text, the present invention will be explained in greater detail by way of example with reference to the attached drawing.

BRIEF DESCRIPTION OF THE DRAWINGS

FIG. 3a shows a block diagram of a first specific embodiment of a method for exerting torque on an object.

FIG. 3b shows a block diagram of a second specific embodiment of a method for exerting torque on an object.

DETAILED DESCRIPTION OF THE INVENTION

Figure 1:
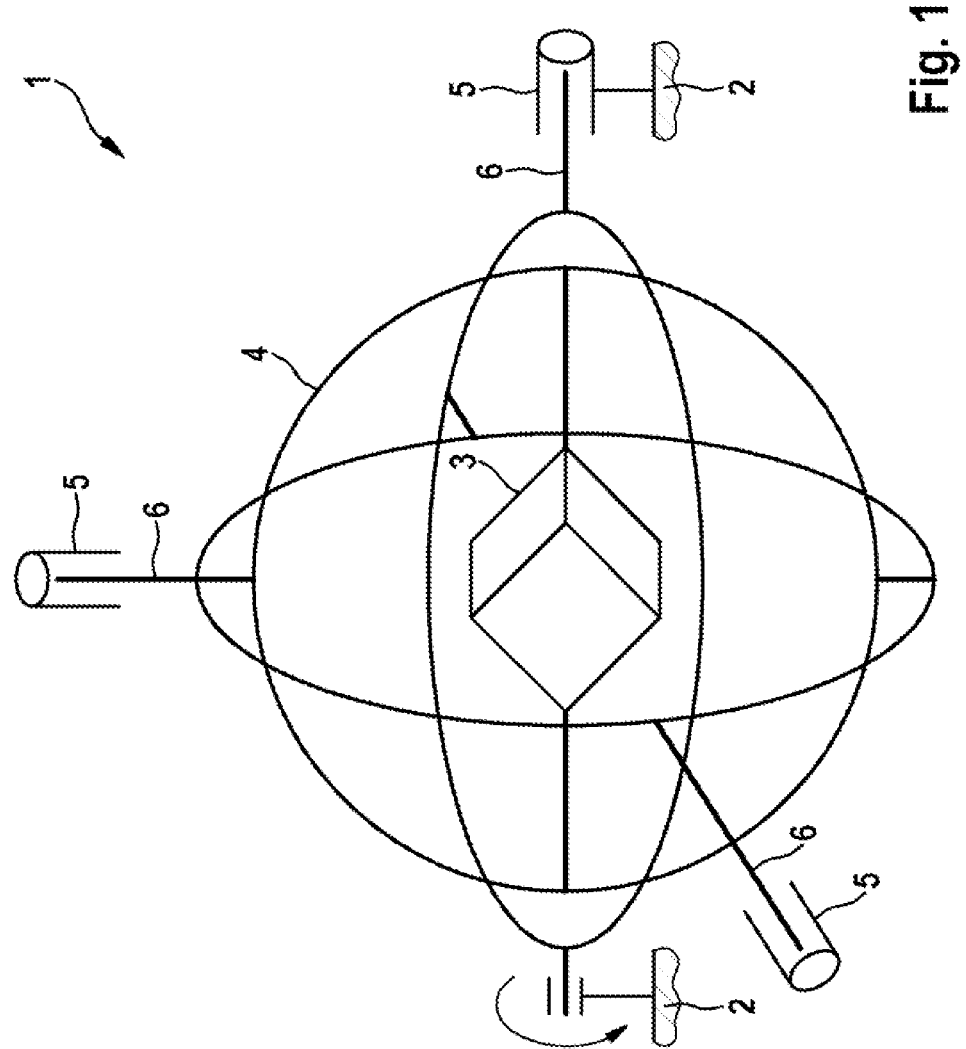
FIG. 1 shows a perspective representation of a device, according to the present invention, for exerting a torque on an object.

FIG. 1 shows a device 1, according to the present invention, for exerting torque on an object 2 in a perspective representation. In this context, device 1 is fastened to object 2, a motorcycle in the present case. However, FIG. 1 only shows schematically the section of the motorcycle bordering directly on the fastening area.

Figure 2:
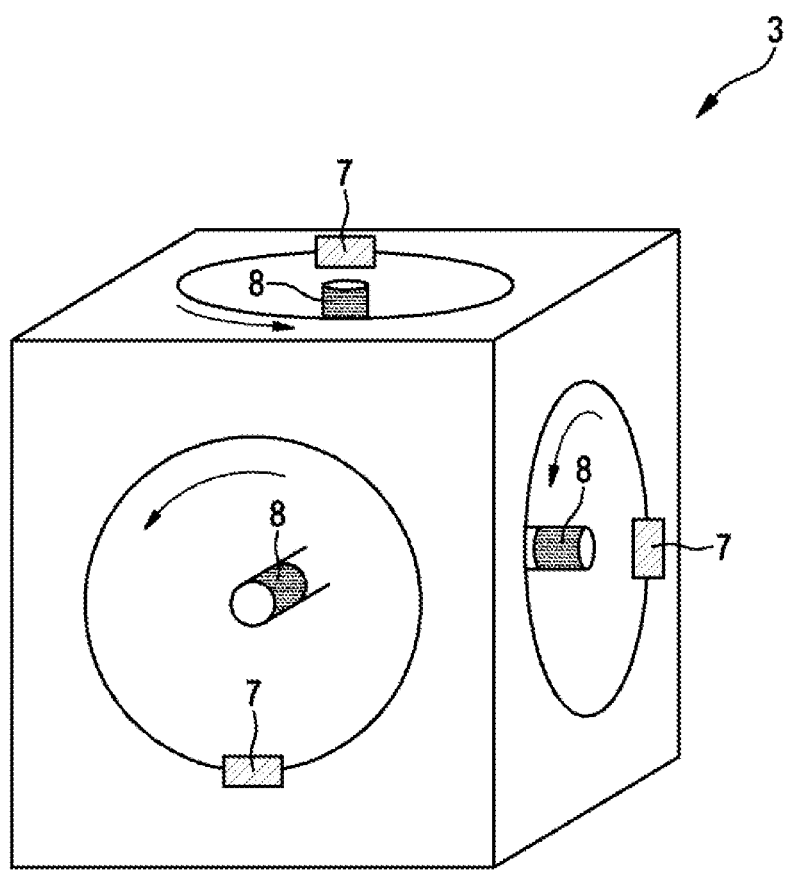
FIG. 2 shows a perspective representation of a body having six rotating masses, which is a part of the device according to the present invention.

Device 1 has a body 3 that has the shape of a die and is shown in greater detail in FIG. 2, having six rotatably supported rotating masses 7, bearing means 4 and coupling means 5. Body 3 is provided for building up, dissipating or storing rotational pulse. For this purpose, rotating masses 7 of body 3 are first set in revolution, and the revolution is then kept up, accelerated or braked. The position of body 3 and, with that, of axes of rotation 8, may also optionally be changed, whereby, in turn, the overall rotational pulse of body 3 changes.

Body 3 is supported on motorcycle 2 using a bearing means 4, in this case a Cardanic suspension. With the aid of coupling means 5, body 3 is able to be coupled to, or decoupled from motorcycle 2. Device 1 according to the present invention is able to take up at least two different states: a decoupled state in which body 3 is decoupled from motorcycle 2, and a coupled state in which body 3 is coupled to motorcycle 2. In the decoupled state (the normal state) body 3, and thus also axes of rotation 8 of rotating masses 7, is able to align itself freely relative to the motorcycle. Essentially no forces are able to be transmitted between body 3 and motorcycle 2 (except for frictional forces of bearing means 4). In contrast, in the coupled state, torque is able to be transmitted from body 3 to the motorcycle (and vice versa).

Consequently, it is possible to act upon motorcycle 2 in a targeted manner.

For the purpose of coupling body 3 to motorcycle 2, the bearings, with which axes 6 of the three rings of Cardanic suspension 4 are supported, may be fixed in position. The position of the individual rings of the Cardanic suspension is able to be changed in the process, using a drive (not shown). Consequently, the possibility of a force transmission between body 3 and motorcycle 2 exists. In addition, the position of axes 6 may also be adjusted. Thus, by changing the position of axes 6, a rotational pulse may be transmitted to motorcycle 2.

Body 3 is shown in greater detail in FIG. 2. It has three pairs of oppositely disposed rotating masses 7 that are rotatably supported about axes of rotation 8, of which only three are shown in FIG. 2, however. Rotating masses 7 are able to be accelerated on circular paths using a drive that is not shown in greater detail, rotating masses 7 lying opposite to each other, which rotate about the same axis of rotation 8, being respectively accelerated in opposite directions. Thus, rotational pulse is able to be built up in body 3. If the rotational pulse stored in body 3 is changed by transmitting a torque onto rotating masses 7, this triggers a counter-torque, according to the principle of reciprocity, which, in the coupled state, is transmitted to motorcycle 2. Consequently, a torque may be transmitted onto motorcycle 2, using device 1.

In device 1, there exist several possibilities of bringing about a rotational pulse change on rotating masses 7 of body 3, and thereby to transmit a counter-torque to motorcycle 2. For one thing, using a drive that is not shown in greater detail, such as an electric motor, or a brake that is also not shown in greater detail, one is able to act on one or several of rotating masses 7. In this process, rotating masses 7 are braked or accelerated. In this way, the torque of one or more rotating masses 7 is changed, and the corresponding counter-torque is transmitted to motorcycle 2.

Another possibility of transmitting a counter-torque to motorcycle 2 using device 7 shown, is changing the position of body 3 in space, using coupling means 5. In this context, the rotational speeds of rotating masses 7 are able to be held constant in body 3, using the electric motor or the brake. In this way, too, the rotational pulse in body 3 is changed. Since the rotational speeds of the individual rotating masses 7 are held constant, the overall rotational pulse remains the same in absolute value, but the direction of the rotational pulse changes. For this, a torque has to be exerted on body 3 which, in turn, acts back on motorcycle 2.

FIGS. 3a and 3b show block diagrams of two different specific embodiments of the method, according to the present invention, for transmitting torques to an object. The object may be a motorcycle 2, for example. It is common to both specific embodiments that it is first monitored and assessed whether, and at which time torque is to be exerted on motorcycle 2.

After the specific embodiment shown in the block diagram in FIG. 3a, in a first step S1, data are recorded on the driving condition of motorcycle 2. In the present case, acceleration values, the rotational rate, the steering angle and the wheel speeds are recorded as data. For this, acceleration sensors, rotational speed sensors, steering angle sensors and wheel speed sensors are used.

In a further method step S2, it is checked whether the driving condition is to be assessed as being critical. A driving condition is considered critical, for example, if the acceleration values or the rotational rate values exceed specified threshold values. High acceleration values and rotational rate values may point, for instance, to fishtailing of motorcycle 2 or skidding of the rear wheel. In this case, using the method according to the present invention, a torque is exerted on motorcycle 2, which is intended to stabilize the motorcycle and bring it back to a stable driving situation.

If it is determined in second step S2 of the method that the driving condition is not to be graded as critical, the system returns to step S1, and runs through step S1 again.

If the driving condition in step S2 is assessed to be critical, a torque is ascertained in step S3 that is to be transmitted to motorcycle 2. The torque may be read out from a characteristic curve, for example, or may be calculated from the data on the driving condition.

In a fourth method step S4, a torque is then calculated which has to be exerted on rotating masses 7 of device 1 in order to have the effect of the previously calculated torque.

In a fifth step S5, bearing means 4 are fixed in position so that a torque transmission to motorcycle 2 is possible.

In a sixth step S6, rotating masses 7 are accelerated or braked in such a way that the desired counter-torque is generated and exerted on motorcycle 2. As soon as the motorcycle has become stabilized again and the rotational speeds of the rotating masses have slowly been accelerated or braked again to the nominal value, and the fixing in position of bearing means 5 has been released, the system returns to method step S1.

In the specific embodiment shown in FIG. 3b, method steps S7-S10 run identically with steps S1-S4 of the method shown in FIG. 3a. In a further method step S11, however, the rotational pulse is held constant as an absolute value, by accelerating or braking rotating masses 7, and bearing means 4 are rotated into a desired direction using coupling means 5. By doing this, the counter-torque ascertained in step S10 is transmitted to motorcycle 2. When the driving situation of motorcycle 2 has been stabilized again, coupling means 5 are switched to free-wheeling again. Thereby no further torques are present on motorcycle 2.

What is claimed is:

1. A device for exerting torque on an object, comprising:
    at least one rotating mass rotatably supported about an axis of rotation;
    a drive for driving the rotating mass;
    a bearing for supporting the rotating mass on the object, wherein the bearing permits a change in the alignment of the axis of rotation relative to the object; and
    a coupling unit which engages on the bearing, wherein the at least one rotatably supported rotating mass is able to be selectably coupled to the object using the coupling unit and selectably decoupled from the object.

2. The device as recited in claim 1, wherein the bearing includes a Cardanic suspension.

3. The device as recited in claim 1, wherein the coupling unit is configured for at least one of fixing the bearing in position and releasing of the bearing.

4. The device as recited in claim 1, wherein the coupling is configured so that the position of the axis of rotation of the rotating mass is able to be changed in the coupled state.

5. The device as recited in claim 4, wherein a brake is provided for exerting a braking force on the rotating mass.

6. The device as recited in claim 2, wherein at least one body having six rotating masses is provided and supported Cardanically relative to the object using the bearing, in each case two rotating masses being rotatable about the same axis of rotation in opposite directions.

7. The device as recited in claim 6, wherein the object is a vehicle.

8. A method for exerting torque on an object using a device for exerting torque on an object, the device including at least one rotating mass rotatably supported about an axis of rotation; a drive for driving the rotating mass; a bearing for supporting the rotating mass on the object, wherein the bearing permits a change in the alignment of the axis of rotation relative to the object; and a coupling unit which engages on the bearing, wherein the at least one rotatably supported rotating mass is able to be selectably coupled to the object using the coupling unit and selectably decoupled from the object, the method comprising:
    recording data on a stability state of the object, using at least one sensor;
    ascertaining from the recorded data whether the stability state is critical;
    ascertaining a counter-torque to be transmitted to the object for stabilizing the object;
    ascertaining a torque that is to be exerted on at least one of the rotating masses, in order to effect the desired counter-torque, and exerting the torque on at least one of the rotating masses, if the stability state has been ascertained as critical.

9. The method as recited in claim 8, wherein the bearing is fixed in position, and at least one rotating mass is one of braked or accelerated if the stability state has been ascertained as critical.

10. The method as recited in claim 8, wherein, for changing the alignment of the axis of rotation of at least one rotating mass, the position of the bearing is adjusted with the aid of a drive, at the coupling unit.

11. The method as recited in claim 9, wherein the object is a vehicle, and at least one of an acceleration, a rate of rotation, a steering angle, and a wheel speed is recorded as the data on the stability state.

12. The device as recited in claim 1, wherein, when the rotating mass is decoupled from the object, the axis of rotation of the rotating mass changes its position without a force being transmitted to the object.

13. The method as recited in claim 8, wherein, when the rotating mass is decoupled from the object, the axis of rotation of the rotating mass changes its position without a force being transmitted to the object.

* * * * *